(No Model.)
O. STALMANN.
APPARATUS FOR REMOVING SLAG.
No. 512,761. Patented Jan. 16, 1894.
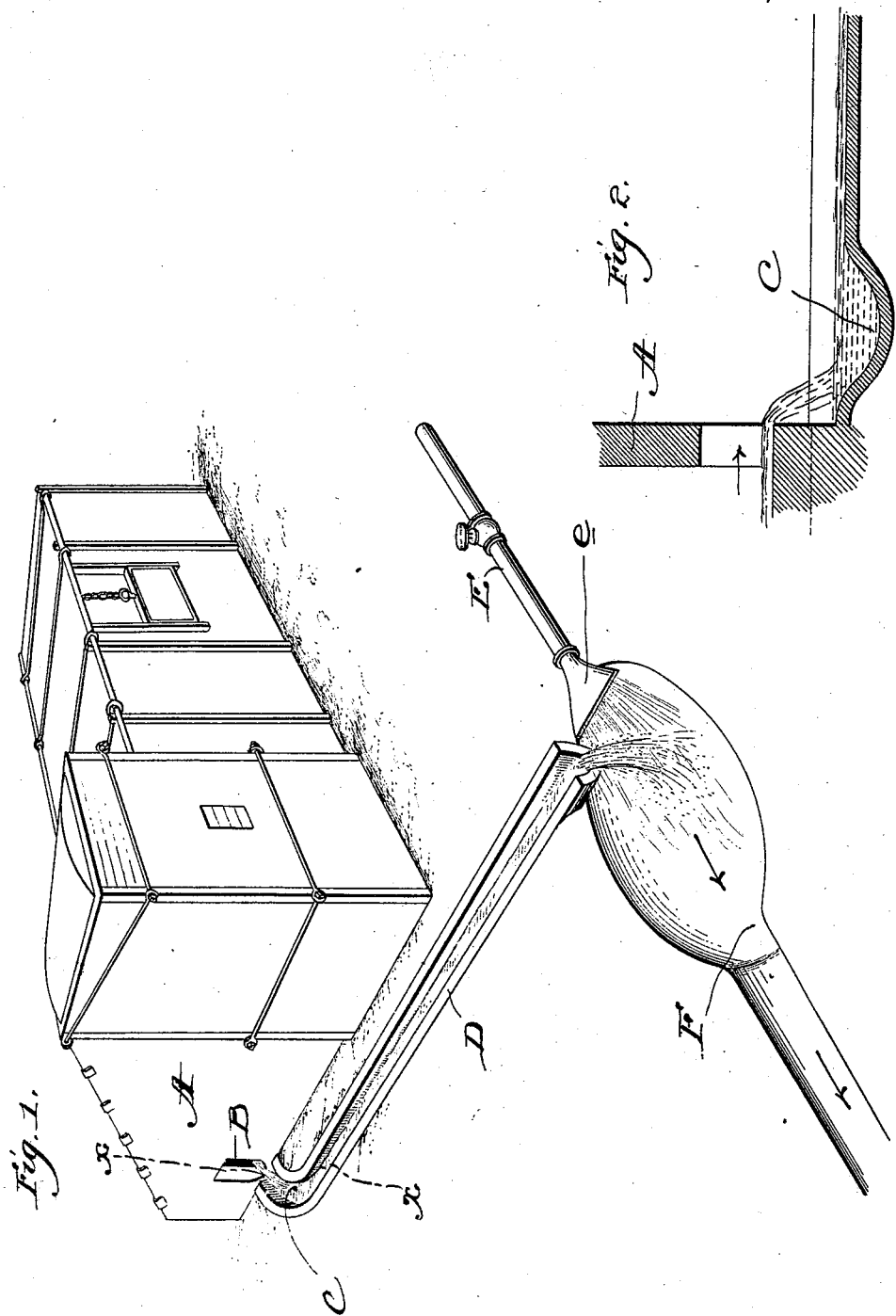
WITNESSES:
Frank S. Busen
H. C. Finnore.
INVENTOR:
Otto Stalmann
by his atty
J. S. Harding.

UNITED STATES PATENT OFFICE.

OTTO STALMANN, OF ANACONDA, MONTANA, ASSIGNOR TO MARCUS DALY, OF SAME PLACE.

APPARATUS FOR REMOVING SLAG.

SPECIFICATION forming part of Letters Patent No. 512,761, dated January 16, 1894.

Application filed June 8, 1891. Serial No. 395,570. (No model.)

*To all whom it may concern:*

Be it known that I, OTTO STALMANN, a citizen of the United States, residing at Anaconda, county of Deer Lodge, and State of Montana, have invented a new and useful Improvement in Apparatus for Removing Slag, of which the following is a full, clear, and exact description, reference being had to the accompanying drawings, which form a part of this specification.

My invention relates to certain improved apparatus whereby the molten slag is subject to the action of a stream of water of such volume and velocity that the slag will be suddenly chilled in the form of a fine powder or of fairly divided consistency and carried off. The stream may extend any desired distance and may lead into a river or any desired depository at any desired distance from the mill.

I will first describe my improved apparatus, and then particularly point out my invention in the claim.

In the drawings—Figure 1 is a perspective view of furnace conduit, &c. Fig. 2 is a section on line x—x, Fig. 1.

A is the furnace, which in the case shown in the drawings is a smelting furnace; but my invention is applicable to the treatment of slag from any furnace.

B is the slag opening. In front of the slag opening is a settling pot or receptacle C.

D is a conduit leading from the settling pot C.

E is a tube or pipe leading from the source of water supply and e is a nozzle on the end of said pipe. The water passes through the pipe E under pressure and the nozzle is in a position adjacent to the end of conduit D.

F is a conduit which extends from the end of pipe E to any desired point or place where the slag is to be deposited.

The slag passes from the furnace A through the slag opening B into the settling pot or receptacle C. If there be any metal held in suspension in this slag it will fall to the bottom of the pot C and may be recovered. The slag overflows from the pot C into the conduit D, through which it flows until it reaches the end of said conduit, where it falls out, and in its passage from said conduit it is struck by the water passing from the pipe E, which is of such volume and velocity that the molten slag is chilled and disintegrated into fine particles, and the velocity of the stream carries it off through the conduit F. This conduit may lead to any desired point or may empty into another stream or river.

Where I have practiced my invention the conduit leads to a river a short distance from the works, and the slag, in the form of a finely divided powder, is carried by said stream through the conduit F and into the river, which is of sufficient quantity and velocity to carry off all the disintegrated slag emptied into it.

Having now fully described my invention, what I claim as new, and desire to protect by Letters Patent, is—

In combination with a furnace provided with a slag opening, a conduit leading from said slag opening adapted to convey molten slag, a pipe adapted to convey water and at an angle to said conduit and provided with a nozzle adjacent to the outlet of said slag conduit, and a conduit leading from said nozzle.

In testimony of which invention I have hereunto set my hand.

OTTO STALMANN.

Witnesses:
THOMAS D. SIMPSON,
FRANK S. BUSSER.